INVENTOR
ROBERT F. O'CONNOR
BY Cushman, Darby & Cushman
ATTORNEYS

INVENTOR
ROBERT F. O'CONNOR
BY Cushman, Darby & Cushman
ATTORNEYS

United States Patent Office 3,715,069
Patented Feb. 6, 1973

3,715,069
PNEUMATICALLY ACTUATED FASTENER DRIVING DEVICE WITH IMPROVED SLEEVE VALVE FOR CONTROLLING THE PRESSURE BENEATH THE DRIVE PISTON
Robert F. O'Connor, Greenville, R.I., assignor to Textron Inc., Providence, R.I.
Filed July 8, 1971, Ser. No. 160,794
Int. Cl. B25c 1/04
U.S. Cl. 227—130                                     6 Claims

ABSTRACT OF THE DISCLOSURE

A pneumatically actuated fastener driving device having a conventional plenum chamber air return system and a sleeve valve mechanism normally biased into an inoperative position permitting unrestricted exhaust flow of air outwardly of the lower end of the drive cylinder through enlarged exhaust ports during the drive stroke of the drive piston and fastener driving element, the sleeve valve mechanism being operable in response to the charging of the plenum chamber with return air at a predetermined pressure to move into an operative position closing off the unrestricted flow through the exhaust ports and communicating the return air with the drive cylinder to effect the return stroke of the drive piston and fastener driving element, the valve mechanism being operable in response to a predetermined decrease in the pressure of the air in the plenum chamber due to expansion into the drive cylinder during the return stroke and to controlled dissipation to atmosphere through a separate path to move back into its normally biased inoperative position at or near the end of the return stroke so as to be properly conditioned for the next drive stroke.

---

This invention relates to pneumatic fastener driving devices and more particularly to improvements in the plenum chamber assembly for effecting the return stroke of the piston and fastener driving element of the device.

Pneumatic fastener driving devices are well known in the art and generally embody a housing defining a reservoir for receiving air under pressure from a suitable source, a drive cylinder, a drive piston slidably mounted within the drive cylinder, a fastener driving element connected with the piston for movement therewith through a drive track communicating laterally with a fastener magazine assembly. The device includes an air system including a manually actuated valve mechanism pneumatically controlling a main valve mechanism for communicating the reservoir with the drive chamber to effect the drive stroke of the piston and fastener driving element during which the leading fastener in the drive track is moved outwardly thereof into a workpiece.

Various arrangements have been utilized in devices of this type for effecting the return stroke of the piston and fastener driving element, as for example, a return spring, a differential piston return or a plenum chamber return. The plenum chamber type return is particularly advantageous in that it permits the device to have a lower profile than is the case with the differential piston return and to utilize the air pressure more efficiently than a spring return.

The conventional plenum chamber return system usually includes an opening in the wall of the cylinder at a position spaced slightly above the seal of the piston when the latter has substantially completed its drive stroke. The pressure acting on the piston to effect its drive stroke is communicated through these openings, toward the end of the drive stroke, to a plenum chamber which usually is disposed in surrounding relation to the lower portion of the cylinder. When the piston reaches the end of its drive stroke, an annular seal is formed in the bottom of the cylinder in surrounding relation to the fastener driving element and the drive track at a position spaced radially inwardly from the lower end of the cylinder. The latter includes openings therein communicating with the plenum chamber permitting the charge of air within the plenum chamber to enter the lower end of the drive cylinder in a position to act upon the downwardly facing outer peripheral surface of the piston when the pressure acting on the upper surface of the piston is exhausted to atmosphere by the closing of the main valve. The return air serves to effect a rapid return stroke at the beginning of which the annular seal surrounding the fastener driving element and drive track is broken. When this seal is broken, a restricted passage provided by the clearance of the fastener driving element within a disk mounted within the bottom of the drive cylinder permits controlled dissipation of the return air pressure to atmosphere through the drive track.

Desirably, this clearance must be sufficiently open to effect substantial dissipation of the return air to atmosphere by the time the piston has completed its return stroke, while at the same time sufficiently restricted to insure completion of the return stroke. As the restriction of the clearance is increased, driving efficiency is diminished because the air beneath the piston cannot be dissipated to atmosphere completely during the drive stroke and tends to build up during the drive stroke. This pressure build-up constitutes a force opposing the drive force and thus diminishes the efficient utilization of the air pressure source available to effect the drive stroke.

Various valving arrangements have been proposed to provide considerably less restriction to the flow of air outwardly of the bottom of the cylinder during the drive stroke while at the same time maintaining a greater restriction during the return stroke to insure completion of the return stroke.

The present invention contemplates the provision of a sleeve valve within the lower end portion of the plenum chamber which is normally spring biased into a position permitting the lower end of the cylinder to communicate with relatively large exhaust openings so that the air in the lower end of the cylinder can be completely discharged to atmosphere during the drive stroke without any appreciable build-up which would generate a force opposing the drive stroke, the sleeve valve including surface means responsive to the charging of the plenum chamber with pressure toward the end of the drive stroke which serves to effect movement of the sleeve valve into a position closing the large exhaust openings. With this arrangement a very restricted clearance between the fastener driving element and the disk can be maintained. The arrangement contemplates a spring actuated opening of the sleeve valve toward the end of the return stroke as a result of the reduction in pressure within the plenum chamber simply by reason of its expansion into the drive chamber without the necessity of providing for an alternate discharge path between the fastener driving element and the drive track.

Accordingly it is an object of the present invention to provide a sleeve valve arrangement of the type described which achieves the improved results set forth above.

Another object of the present invention is the provision of an improved valve mechanism for a plenum chamber return air system which is simple but effective in operation and economical to manufacture.

These and other objects of the present invention will become more apparent during the course of the following detailed description and appended claims.

The invention may best be understood with reference to the accompanying drawings.

Figure 1:
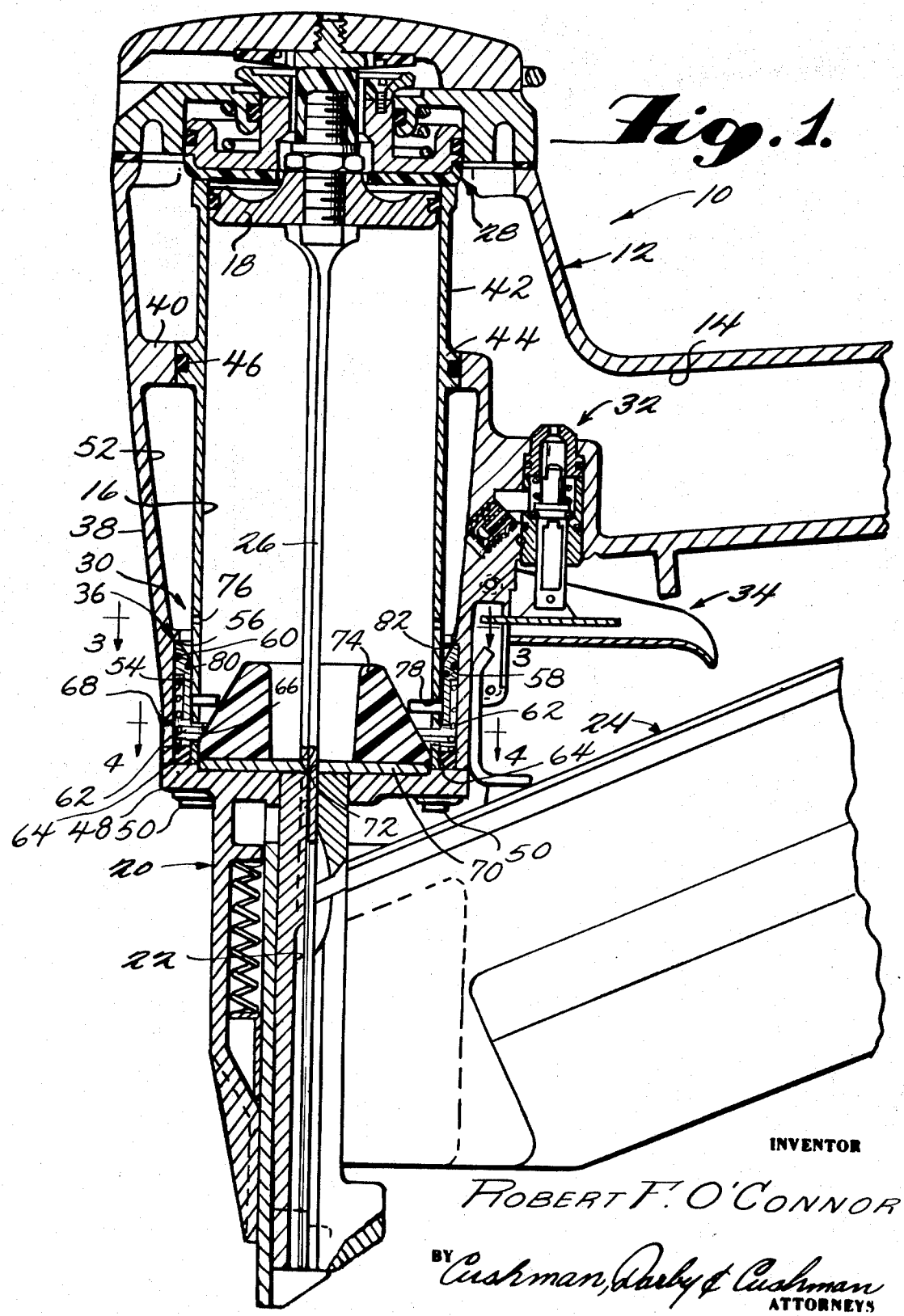
FIG. 1 is a vertical sectional view of a fastener driving device embodying the principles of the present invention, showing the position of the parts in their normal inoperative position.
Figure 2:
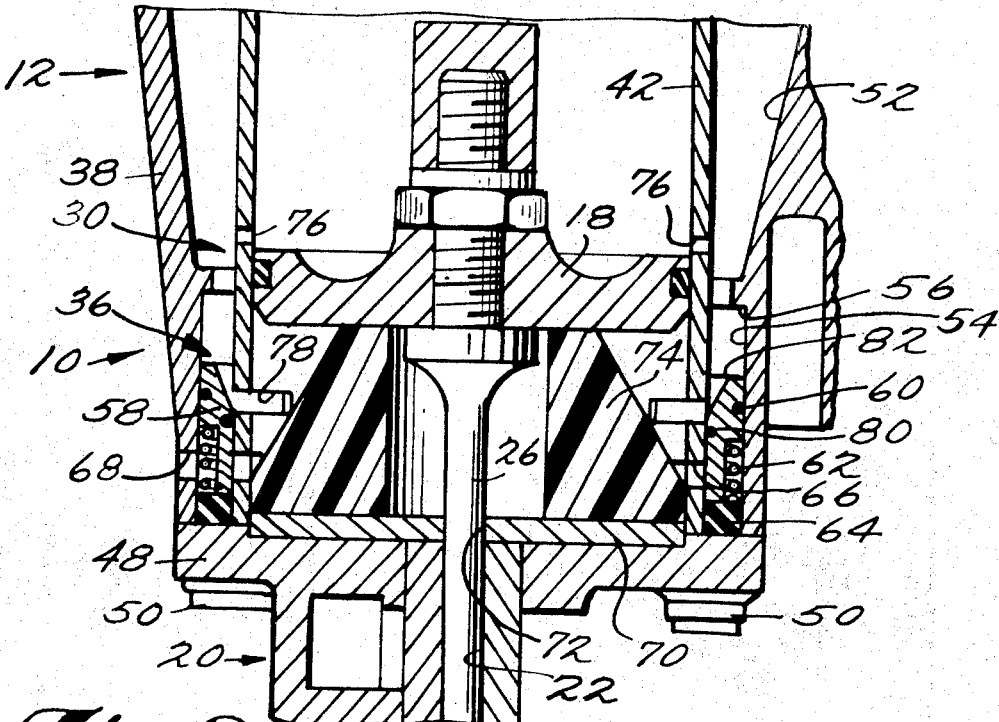
FIG. 2 is an enlarged fragmentary vertical sectional view of the improved valve mechanism of the present invention showing the parts thereof in the position assumed during the return stroke of the piston and fastener driving element.
Figure 3:
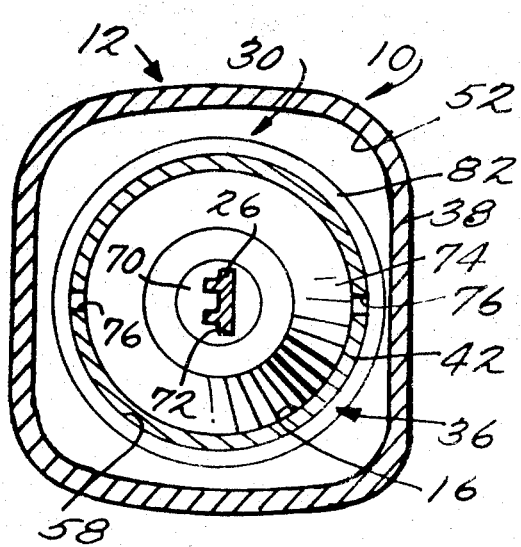
FIG. 3 is a cross-sectional view taken along the line 3—3 of FIG. 1.
Figure 4:
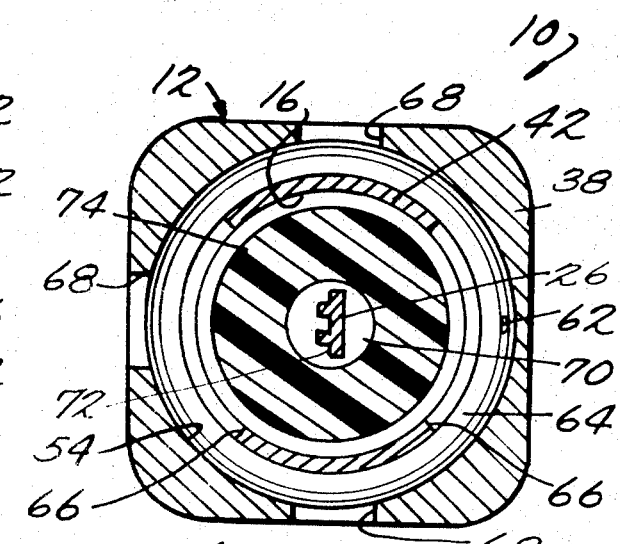
FIG. 4 is a cross-sectional view taken along the line 4—4 of FIG. 1.

Referring now more particularly to the drawings, there is shown in FIGS. 1-3 thereof a fastener driving apparatus, generally indicated at 10, embodying the principles of the present invention. In the drawings, the apparatus is shown oriented so as to drive a fastener vertically downwardly into a horizontal workpiece. It will be understood, however, that the apparatus is capable of driving a fastener into workpieces oriented in any position other than the horizontal. For convenience, the apparatus will be described in relation to the orientation illustrated, and consequently terms such as "horizontal," "vertical," "above," "below," "forward," "rearward," etc. as used herein are to be construed in their relative sense. The apparatus 10 includes a housing structure 12 having internal surfaces defining a reservoir 14 for receiving air under pressure from a suitable source (not shown) communicated with a reservoir by means of a conventional fitting (likewise not shown). Means is provided within the housing structure 12 defining a cylindrical chamber 16 within which a driving piston 18 is slidably mounted. The housing structure 12 includes a nosepiece assembly 20 defining an elongated drive track 22 which is axially aligned with the cylindrical chamber 16 and communicates laterally with a magazine assembly generally indicated at 24. The magazine assembly is operable to receive a supply of fasteners and to feed successive leading fasteners from the supply contained therein into the drive track. Successive fasteners moved into the drive track 22 by the fastener magazine assembly 24 are driven outwardly of the drive track and into a workpiece by a fastener driving element 26 connected with the piston 18 so as to move with the piston from a first position wherein the piston is disposed in the upper end of the cylindrical chamber 16 and the lower end of the fastener driving element is disposed above the fastener within the drive track 22 through a drive stroke into a second position wherein the piston is disposed adjacent the lower end of the cylindrical chamber 16 and from said second position through a return stroke back into the first position.

The drive stroke of the piston 18 and fastener driving element 26 is accomplished by communicating the air under pressure within the reservoir 14 with the upper end of the cylindrical chamber 16 under the control of a main valve mechanism, generally indicated at 28. The main valve mechanism 28 is mounted for movement between a first position preventing communication between the reservoir and the upper end of the cylindrical chamber 16 and establishing communication of the upper end of the cylindrical chamber 16 with the atmosphere and a second position wherein the communication between the upper end of the cylindrical chamber 16 and the atmosphere is discontinued and communication of the reservoir 14 with the upper end of the cylindrical chamber 16 is established. Air under pressure serves to effect the return stroke of the piston 18 together with the fastener driving element 26 in response to the movement of the main valve mechanism 28 into its first position, the return air being controlled and communicated by a plenum chamber assembly, generally indicated at 30. The main control valve mechanism 28 is moved between its first and second positions by a pilot pressure air system, generally indicated at 32, controlled manually by a manual actuating mechanism, generally indicated at 34.

The present invention is particularly concerned with an improved valve mechanism, generally indicated at 36, embodied in the plenum chamber assembly 30. It will be understood that the plenum chamber assembly 30 with the improved valve assembly 36 therein has general applicability to any of the well-known fastener driving devices. Consequently, the details of construction and specific mode of operation of the housing structure 12, nose piece assembly 20, magazine assembly 24, main valve mechanism 28, pilot pressure air system 32 and manual actuating mechanism 34 are not essential to an understanding of the present invention. These component elements which form a part of the combination of the present invention are illustrated in detail in the drawings by way of example. The specific example illustrated is described in commonly-assigned co-pending applications Ser. No. 138,149, in the name of George E. Burke, Jr. filed Apr. 28, 1971 and in the name of Peleg B. Briggs, Jr., Ser. No. 138,148, filed Apr. 28, 1971, the disclosures of which are hereby incorporated by reference into the present specification. Reference to the aforesaid pending applications may be made for the purpose of ascertaining any structural or operational details. For the present purpose, it is sufficient to describe the improved valve mechanism 36 and the modifications in the structural components of the device disclosed in the co-pending applications required in accordance with the principles of the present invention.

To this end, it will be noted that the housing 12 includes a vertically extending drive portion 38 formed with an interior flange 40 intermediate its ends and with its lower end open. The drive chamber 16 is provided by a cylindrical member 42 having an outwardly extending flange 44 formed intermediate its ends which is adapted to engage within the flange 40 in sealing relation thereto, as by an O-ring seal 46. The lower end of the cylinder member 42 is disposed within the open lower end of the housing portion 38 in radially inwardly extending relation thereto. The nosepiece 20 includes a horizontally extending upper portion 48 which is recured to the lower end of the housing portion 38, as by its bolts 50 or the like, and receives the lower end of the cylinder member 42. The interior periphery of the housing portion 38 extending downwardly from the flange 40 and the exterior periphery of the cylinder member 42 extending downwardly from the flange 44 together with the contiguous annular area of the horizontal portion 48 of the nosepiece 20 defines a plenum chamber 52 of the plenum chamber assembly 30.

The lower portion of the plenum chamber 52 is defined exteriorly by a cylindrical surface 54 formed on the lower interior of the housing portion 38 and terminating at its upper end in an annular shoulder 56 forming a stop surface. Mounted within the lower end portion of the plenum chamber 52 in sliding engagement with the surface 54 is a sleeve valve member 58. The sleeve valve member is formed with an annular groove at its exterior peripheral surface which receives an O-ring seal 60 providing sealing engagement between the valve member and the cylindrical surface 54. The valve member 58 is biased upwardly into a normally inoperative position of engagement with the stop surface 56 by a coil spring 62 surrounding the lower end of the sleeve member with its upper end in engagement with a downwardly facing shoulder formed in the exterior periphery of the sleeve member and its lower end in engagement with a valve seat ring 64 of resilient material disposed within the lower end portion of the plenum chamber between the housing portion 38 and cylinder member 42 in engagement with the contiguous upper surface of the horizontal portion 48 of the nosepiece.

The sleeve valve member 58 in its inoperative position permits an unrestricted flow of air from within the drive chamber 16 below the piston during the drive stroke of the latter outwardly to atmosphere through a first set of relatively large discharge openings 66 formed in the cylinder member 42 at a position just above the valve seat ring 64 and a second set of relatively large discharge openings 68 formed in the adjacent portion of the housing portion 38.

Mounted in engagement with the horizontal portion 48 of the nosepiece 20 within the bottom of the cylinder member 42 is a restriction disk 70 having a central opening 72 through which the fastener driving element 26 passes with a predetermined clearance. Mounted on the disk 70 is a resilient bumper member 74 providing an upper surface for engagement by the piston 18 when the latter reaches the end of its drive stroke.

The plenum chamber assembly 30 also includes conventional upper inlet openings 76 for charging the plenum chamber 52 with air under pressure from the drive chamber 16 at the end of the drive stroke of the piston and conventional lower inlet openings 78 for communicating the air under pressure within the plenum chamber to the lower end of the drive chamber to effect the return stroke of the piston. The inlet openings 76 extend radially through the cylinder member 42 at a position spaced slightly above the piston seal when the piston engages the bumper member 74. The inlet openings 78 extend radially through the cylinder member 42 at a position below the piston when the latter is in engagement with the bumper member 74.

The sleeve valve member 58 has an annular groove formed in the interior periphery thereof for receiving an O-ring seal 80 which is adapted to engage the exterior periphery of the cylinder member 42 at a position between the upper inlet openings 76 and the lower inlet openings 78 when the valve member is disposed in its normally biased inoperative position. The valve member 58 thus provides an upwardly facing pressure surface 82 extending between the inner O-ring seal 80 and outer O-ring seal 60 which communicates with the plenum chamber 52 and against which the pressure introduced into the plenum chamber acts to effect a movement of the sleeve valve from its normally biased inoperative position downwardly into an operative position in engagement with the valve seat ring 64. In its operative position the member 58 closes off communication between the discharge openings 66 and 68 but serves to communicate with openings 76 and 78.

The operating cycle is initiated by manual actuation of the manual actuating mechanism 34 which, through the operation of the pilot pressure system 32 has the effect of moving the main valve mechanism 28 from the closed or first position shown in FIG. 1 upwardly into an open or second position wherein the air under pressure within the reservoir 14 is communicated with the upper end of the drive chamber 16. In accordance with conventional practice, when the main valve mechanism 28 is in its open position communication of the uper end of the drive chamber to the atmosphere is closed off.

With reference to FIG. 1, it will be noted the imitation of the operating cycle takes place with the sleeve valve member 58 disposed in its normally biased inoperative position, that is, with the spring 62 maintaining the valve member in engagement with the stop surface 56, thus providing relatively unrestricted communication of the lower end of the drive chamber 16 to the atmosphere through the relatively large communication discharge openings 66 and 68. Thus, as the main valve mechanism 28 is moved from its closed position to its open position and the piston 18 is moved through its drive stroke by the air under pressure from the reservoir 14, the air beneath the piston within the drive chamber 16 can freely flow to the atmosphere without any appreciable pressure build-up establishing a force opposing the drive stroke.

As the piston reaches the end of its drive stroke, the annular piston seal passes the upper inlet openings 76 and the air under pressure within the upper end of the drive chamber 16 acting on the upper surface of the piston passes into the plenum chamber 52. As the plenum chamber is charged with air under pressure, this pressure acting on the pressure responsive surface 82 of the sleeve valve member 58 will eventually create a force on the sleeve member 58 sufficient to overcome the bias of the spring 62 and effect movement of the sleeve valve member 58 from its normally inoperative position into its operative position in engagement with the valve seat ring 64, thus closing off communication between the discharge openings 66 and 68 and communicating the pressure in the plenum chamber 52 to the lower end of the drive chamber 16 beneath the piston through lower inlet openings 78.

When the manual actuating mechanism 34 is deactuated causing the main valve mechanism 28 to move from its open position into its closed position, the portion of the drive chamber 16 above the piston is communicated to atmosphere, thus causing the high pressure air within the plenum chamber 52 acting on the lower outer peripheral surface of the piston 18 to effect the return stroke of the piston. During the initial movement of the piston, the piston moves out of engagement with the bumper member 74 and the piston seal moves past the restricted upper inlet openings 76. The pressure within the plenum chamber 52 now acts upon the entire piston (less the area of the fastener driving element) to complete the return stroke. In this regard, it will be noted that the air passage provided by the clearance of the fastener driving element within the restriction disk can be maintained at a minimum so as to insure that the return air will not be dissipated to atmosphere through the drive track without effecting a complete return stroke. On the other hand, it will be noted that since the pressure initially within the plenum chamber expands within the drive chamber in effecting the return stroke, the plenum chamber pressure decreases during the return stroke so that the force acting downwardly on the sleeve valve pressure surface 82 diminishes. When this pressure diminishes, by the combined effect of the expansion and clearance exhaustion, to a point less than the force of spring 62, the latter will act to move the valve member 58 back into its normally biased inoperative position. In this way, at or toward the end of the drive stroke, the sleeve valve member 58 moves upwardly providing the unrestricted communication between the large discharge openings 66 and 68, preparatory to the next drive stroke.

It can thus be seen that there has been provided an improved valve mechanism 36 which permits a most efficient utilization of the air under pressure available for effecting the drive stroke of the piston and fastener driving element, while at the same time insuring a complete return stroke thereof. The improved valve mechanism 36 is operable only after sufficient charge of high pressure air is built up into the plenum chamber to effect the return stroke.

While the improved valve mechanism is shown in conjunction with a preferred pilot pressure system which is operable to move the main valve mechanism 28 into its closed position in response to the establishment of a predetermined pressure condition within the plenum chamber 52 following the completion of the drive stroke, it will be understood that the improved valve mechanism 36 would have general applicability within plenum chamber return systems utilized with other well-known pilot pressure systems.

What is claimed is:

1. A fastener driving device comprising a housing, means within said housing defining a reservoir for receiving and containing fluid under pressure supplied thereto from a source of fluid under pressure, means within said housing defining a cylinder having one end arranged for communication with said reservoir, a piston mounted within said cylinder for movement from a first position adjacent said one cylinder end through a drive stroke into a second position adjacent the opposite end of said cylinder and from said second position through a return stroke into said first position, means carried by said housing defining a drive track, means carried by said housing for receiving a supply of fasteners and for feeding successive fasteners from said supply laterally into said drive track, a fastener driving element slidably mounted within said drive track and operatively connected with said piston for movement thereby through a drive stroke in response to the drive stroke of said piston to drive a fastener in said drive track outwardly into a workpiece and through a return stroke in response to the return stroke of said piston.

main valve means operable in a first position to communicate said reservoir with said one cylinder end so as to effect the drive stroke of said piston and fastener driving element and operable in a second position to communicate said one cylinder end with the atmosphere so as to permit the return stroke of said piston and fastener driving element, means within said housing defining an annular return air chamber surrounding said cylinder, exhaust port means for the opposite end of said cylinder of a size sufficient to permit flow of air within the opposite end portion of said cylinder to atmosphere during the drive stroke of said piston without substantial restriction, said cylinder having opening means therein disposed at a position such that the air under pressure within said one cylinder end acting on said piston during said drive stroke is communicated with said annular chamber when said piston reaches the end of said drive stroke, annular valve means mounted within said annular chamber for movement between a normally biased first position wherein said annular valve means is operable to substantially unrestrictively communicate the opposite end of said cylinder with said exhaust port means and to prevent communication between said annular chamber and said opposite cylinder end except by said opening means and a second position wherein said annular valve means is operable to prevent communication between the opposite end of said cylinder and said exhaust port means and to communicate said annular chamber with the opposite end of said cylinder, said annular valve means having pressure responsive surface means operable in response to the communication of air under pressure with said annular chamber through said opening means when said piston reaches the end of said drive stroke for overcoming the normal bias of said annular valve means and effecting movement from said normally biased first position into said second position so that the air under pressure within said annular chamber is available to effect the return stroke of said piston when said main valve means is moved into said second position, and means separate from said exhaust port means for dissipating the air under pressure within said opposite cylinder end when said piston return stroke is completed thereby dissipating the air under pressure within said annular chamber and permitting said annular valve means to be normally biased into the first position thereof so that the opposite end of said cylinder will be communicated with said exhaust port means when said main valve means is moved into said first position to effect the drive stroke of said piston.

2. A fastener driving device as defined in claim 1 wherein said annular valve means is biased into said inoperative position by spring means operatively connected between said annular valve means and said housing.

3. A fastener driving device as defined in claim 1 wherein said housing includes a drive portion having an open end adjacent said opposed cylinder end and a rigid nosepiece having a portion detachably fixedly secured to said housing drive portion adjacent the open end thereof, said drive track defining means being disposed within said nosepiece, and a disk mounted on said nosepiece portion and having an opening thereon receiving said fastener driving element therethrough providing a predetermined clearance passage between said opposite cylinder end and said drive track which constitutes said means separate from said exhaust port means for dissipating the air under pressure within said opposite cylinder end.

4. A fastener driving device as defined in claim 3 wherein said cylinder defining means comprises a separate cylinder member mounted within said housing drive portion, said cylinder member and said housing drive portion including opposed exterior and interior cylindrical surface portions respectively disposed adjacent said nosepiece portion, said annular valve means comprising a sleeve valve member slidably sealingly engaging said opposed cylindrical surface portions.

5. A fastener driving device as defined in claim 4 wherein said annular valve means includes a fixed annular valve seat engageable by an end of said sleeve valve member when the latter is disposed in said operative position, said exhaust port means including a plurality of circumferentially spaced exhaust openings in said cylinder member adjacent said valve seat, said cylinder member having a plurality of circumferentially spaced inlet openings therein spaced axially between said exhaust openings and said opening means.

6. A fastener driving device as defined in claim 5 wherein said exhaust port means further includes a plurality of exhaust openings in said housing drive portion adjacent the exhaust openings in said cylinder member.

References Cited

UNITED STATES PATENTS

| 3,434,643 | 3/1969 | Wandel | 227—130 |
| 3,584,775 | 6/1971 | Volkmann | 227—130 |
| 3,601,007 | 8/1971 | Korth | 227—130 |

GRANVILLE Y. CUSTER, Jr., Primary Examiner